United States Patent [19]

Lee et al.

[11] 4,425,289
[45] Jan. 10, 1984

[54] METHOD OF PRODUCING AN EXTRUDATE HAVING CONTROLLED SHAPE AND SIZE

[75] Inventors: Ly J. Lee, Columbus; James F. Stevenson, Hudson; Richard M. Griffith, Akron, all of Ohio

[73] Assignee: The General Tire & Rubber Company, Akron, Ohio

[21] Appl. No.: 412,634

[22] Filed: Aug. 30, 1982

[51] Int. Cl.³ .................................................. B29F 3/00
[52] U.S. Cl. ................................. 264/40.1; 264/40.4; 264/40.6.40.7; 425/140; 425/141; 425/144
[58] Field of Search ............... 425/140, 141, 143–144; 264/40.6, 177 R, 40.1, 40.7, 40.4

[56] References Cited

U.S. PATENT DOCUMENTS

| | | | |
|---|---|---|---|
| 3,699,197 | 10/1972 | Egger | 264/40.7 |
| 3,733,059 | 5/1973 | Pettit | 425/144 |
| 3,975,126 | 8/1976 | Wireman et al. | 425/141 |
| 4,087,499 | 5/1978 | Bayonnet | 264/40.7 |
| 4,088,721 | 5/1978 | Apicella, Jr. | 264/40.4 |
| 4,097,566 | 6/1978 | Bertin et al. | 264/40.7 |
| 4,156,913 | 5/1979 | Apicella, Jr. | 264/40.4 |
| 4,168,290 | 9/1979 | Giles | 264/40.1 |
| 4,233,255 | 11/1980 | Moon | 264/40.4 |
| 4,237,082 | 12/1980 | La Spisa et al. | 264/40.7 |
| 4,290,986 | 9/1981 | Koschmann | 264/40.6 |

FOREIGN PATENT DOCUMENTS

| | | | |
|---|---|---|---|
| 3107701 | 1/1982 | Fed. Rep. of Germany | 264/40.1 |
| 7701816 | 8/1978 | Netherlands | 264/40.7 |
| 802062 | 2/1981 | U.S.S.R. | 264/40.1 |

OTHER PUBLICATIONS

Brown et al., "Practical Principles of Die Design", 37th Annual Conf., Soc. of Plastics Eng., pp. 130–134, 1979.

Primary Examiner—Jeffery R. Thurlow

[57] ABSTRACT

A method of producing an extrudate is disclosed in which on-line adjustments are made to size and shape deviations by varying the temperature conditions in the extruder and by varying the relative speeds along the extrusion line. The temperature conditions can be adjusted by varying the temperature of the stock while maintaining a fixed relationship of the die temperature to the stock temperature to produce deviations in the thickness of the extrudate with respect to the width of the extrudate, and by varying the temperature of the die with respect to the temperature in the stock to produce variations in different thicknesses of the extrudate. The relative speeds along the extrusion line can be varied by changing the speed of the screw in a cold-feed extruder, by changing the feed rate for a hot-feed extruder, or by changing the speed of the take-away device which regulates the speed by which the extrudate is taken away from the extruder.

19 Claims, 5 Drawing Figures

METHOD OF PRODUCING AN EXTRUDATE HAVING CONTROLLED SHAPE AND SIZE

BACKGROUND OF THE INVENTION

1. Field of the Invention

This invention relates to a method of extruding plastic or rubber compounds, and more specifically to a method in which the size and shape of the extrudate are controlled by varying extruder conditions.

2. Description of the Prior Art

An extrusion line comprises an extruder acting as a device for melting and mixing and as a pump to force molten plastic or rubber, or other material, through an irregularly shaped die. The extrudate produced by the extruder is then transported by a take-away device and is cooled in water or air while being transported.

In a cold-feed extrusion line, the output rate of the extruder is determined primarily by the speed of the screw inside the extruder. The screw speed governs the rate at which stock, always present in excess, can be advanced into the feed zone. In a hot-feed extrusion line, the average output rate of the extruder is determined by the average feed rate of hot stock which is supplied from a feed mill located some distance from the extruder.

While the extrusion line is designed to produce an extrudate having specified dimensions, deviations from the specified dimensions are continually being introduced by changes in material properties or by variations in the extrusion line operation. The dimensional variability can be divided into two categories: first, size deviations in which the cross-sectional area changes, but in which the ratios of the width and thickness dimensions (i.e., the shape) are constant; and, second, shape deviations in which the ratios of the width and thickness dimensions change, but in which the cross-sectional area or the weight per unit length (i.e., the size) is constant. In size deviations, all dimensions deviate from specification by the same percentage. In shape deviations, the dimensions deviate by different percentages from the specification, although the overall cross-sectional area remains the same.

In addition, there are two general categories of shape deviations which can occur. In the first type of shape deviations, all thickness dimensions change by approximately the same percentage, and all width dimensions change by approximately the same percentage, but the percentage changes for thickness and width dimensions are different and are of opposite sign. In other words, the extrudate thicknesses may all increase by a certain percentage, while the extrudate widths will all decrease by a different percentage. In the second type of shape deviations, different thickness dimensions change by different percentages, and the width dimensions remain essentially unchanged.

The control of size deviations by manipulating the speed of the screw in the extruder, or by manipulating the speed of the take-away device has been well known in the art. Examples of processes in which the take-away speed is manipulated to control size deviations are found in U.S. Pat. No. 4,087,499, issued to Bayonnet; U.S. Pat. No. 4,088,721, to Apicella; and U.S. Pat. No. 4,097,566 to Bertin et al.

Shape deviations, however, have been much more difficult to control by known means. One way of altering the shape has been to alter the geometry of the die by removing metal from the die opening or by narrowing the die opening by deforming the adjacent metal on the die face. This method has been difficult to use during a production run because it required production to be shut down during die modification and testing, and it very quickly caused a physical deterioration of the die.

Another approach for controlling shape deviations has been to use a die which could be adjusted by heated bolts or by a movable choker bar or mandrel or die sections. This approach has often been used for flat or annular dies. For typical production profile dies, however, this method requires a very complicated mechanical device. For tire tread extrusion, the adjustable sections of the die would also cause discontinuities along the tread profile.

SUMMARY OF THE INVENTION

The present invention provides an improved method for producing an extrudate by simultaneously and efficiently correcting both size and shape variations in the extrudate during the operation of a production run. The method of the present invention allows the extrusion production process to be operated so that the size and shape of the extrudate can be controlled within smaller tolerances than has been heretofore possible. As a result, deviations from specified extrudate dimensions which occur due to changes in material properties or extrusion line operation can be corrected quickly, and the size and shape can be maintained within tighter tolerances, resulting in a significant savings of material and the elimination of waste and scrap which would otherwise occur. This, in turn, increases productivity because a single extruder can have a higher yield and may be run at a higher rate.

In addition, the method of the present invention can result in a significant saving of labor because the size and shape corrections can be performed automatically, without the need for constant off-line measurement of extrudate dimensions and manual adjustment of the extruder or of the dies.

The present invention also produces a higher quality product because the dimensions of the extrudate can be maintained within closer tolerances, resulting in more precision parts and greater value in extrusion operations. The automation of post-extrusion fabrication can be greatly facilitated by having a product with consistent dimensions.

The present invention is also especially adapted to allow for automation of the extrusion process, whereby the actual dimensions of the extrudate are automatically measured, compared to specified dimensions, and the results fed back to the extruder so that extrusion conditions can be varied to correct the dimensions of the extrudate in a continuous process.

These and other advantages are achieved by the present invention of a method of producing an extrudate from stock in an extrusion line having an extruder with an extrusion die. The method comprises the steps of extruding the stock through the die at initial relative speeds and at initial temperature conditions to produce an extrudate having initial size and shape dimensions; measuring size and shape dimensions of the exturdate; varying the temperature conditions to adjust the initial shape and to maintain the shape at predetermined dimensions; and varying the relative speed along the extrusion line to adjust the initial size.

The shape dimension may be represented by one or more thicknesses of the extrudate. The size dimension may be represented by the cross-sectional area of the extrudate, or by the width of the extrudate if the width is sufficiently greater than the thickness. The cross-sectional area of the extrudate may be measured by measuring the linear weight of the extrudate.

In accordance with one aspect of the invention, all thickness dimensions are adjusted together by varying the temperature of the stock while maintaining the temperature of the die in a generally fixed relationship with respect to the temperature of the stock. In accordance with another aspect of the invention, different thickness dimensions are adjusted with respect to each other by varying the temperature of the die relative to the temperature of the stock. In each aspect, after the shape dimensions or thicknesses have been adjusted by varying either the stock temperature or the die temperature in relation to the stock temperature, the relative speed of the extrusion line is varied to return the size dimension or the cross-sectional area to within tolerance. The relative speeds are varied by varying either the rate at which the extruder produces the extrudate or the speed at which the extrudate is taken away from the extruder. The invention thus provides an automatic process by which both size and shape deviations can be corrected, continuously and automatically.

DETAILED DESCRIPTION OF THE PREFERRED EMBODIMENTS

Figure 1:
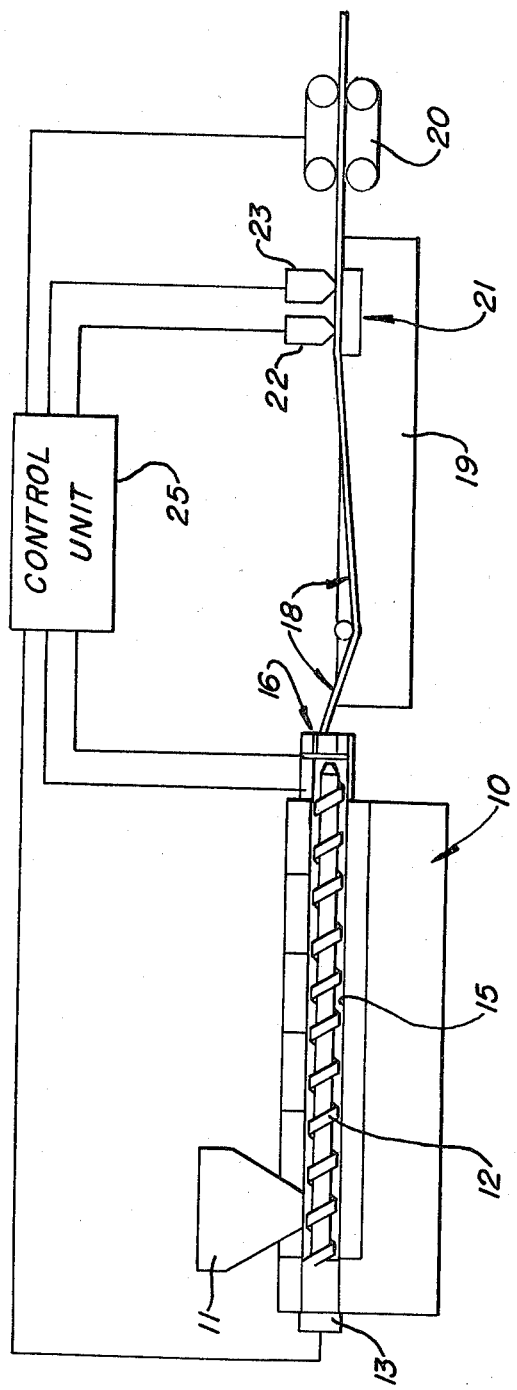
FIG. 1 is a schematic of the extrusion apparatus used to practice the process of the present invention.

Referring more particularly to the drawings, and initially to FIG. 1, there are shown typical cold-feed extrusion apparatus which have been adapted for use in the process of the present invention. The apparatus includes an extruder 10 having a receiving hopper 11 into which raw stock is placed. The extruder 10 has an internal screw 12 which turns by means of a screw speed control 13. The extruder heats, breaks down, mixes, and transports the stock to a reservoir 15 behind an extrusion die 16. The stock is forced through the die 16 by the rotation of the screw 12, producing a continuous extrudate 18. The extrudate 18 is then cooled in a water bath 19, while being transported by a take-away device 20. After being cooled in the bath 19, the extrudate 18 passes through measuring apparatus 21. The measuring apparatus 21 comprises two or more sensors 22 and 23. Each sensor measures the thickness or width or linear weight of a portion of the extrudate, and is used as a measurement of size or shape to sense deviations in the size or shape, as discussed later. A suitable sensor for measuring thickness of the extrudate is a pneumatic, non-contacting, linear variable differential transformer (LVDT), such as Model No. PPD-125, manufactured by Schaevitz Company, of Pennsauken, N.J. With this sensor, measurement is accomplished by a pneumatic servo mechanism which positions a follower a few thousandths of an inch away from, but not touching, the upper surface of the extrudate. The LVDT is coupled to the movable member of the follower to provide stepless, linear, electrical output proportional to the thickness of the moving extrudate. This device is able to measure the thickness to within 1 mil. Other sensors known in the art can also be used. For example, laser devices can be used for thickness and width measurements. To measure cross-sectional area, a weigh scale may be positioned to measure linear weight (weight per unit length).

The output of the sensors 22 and 23 is supplied to a control unit 25. The control unit 25 then uses the dimensions measured by the sensors 22 and 23, and compares them to specified dimensions to control the conditions and operations of the extruder 10 to bring the dimensions within required tolerances. The screw speed control 13 may be connected to the control unit 25, whereby the control unit 25 may be used to control the speed of the extruder screw 12. In accordance with known techniques, the speed of the screw may be used to control size deviations, i.e., deviations in which all dimensions deviate from specification by about the same percentage.

For hot-feed extruders, the size of the extrudate can be controlled by varying the feed rate through adjustments to the width, thickness, or speed of the feed strip.

Alternatively, the take-away device 20 may be connected to the control unit 25, whereby the speed of the take-away rollers is varied instead of varying the screw speed. In accordance with known techniques, the speed of the take-away device 20 may be used to control size deviations in which all dimensions deviate from the specification by about the same percentage.

According to the present invention, the control unit 25 is also connected to the extruder 10 and/or the die 16 so that it can be used to control the temperature of the stock in the extruder 10 and to control the temperature of the die 16. By controlling the extruder temperature conditions, it is possible to control shape deviations in which different dimensions deviate by different percentages from the specification, although the overall cross-sectional area does not change.

Figure 2:
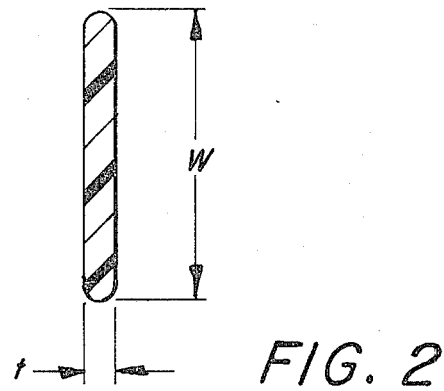
FIG. 2 is a cross-sectional view of a simple extrudate shape.
Figure 3:
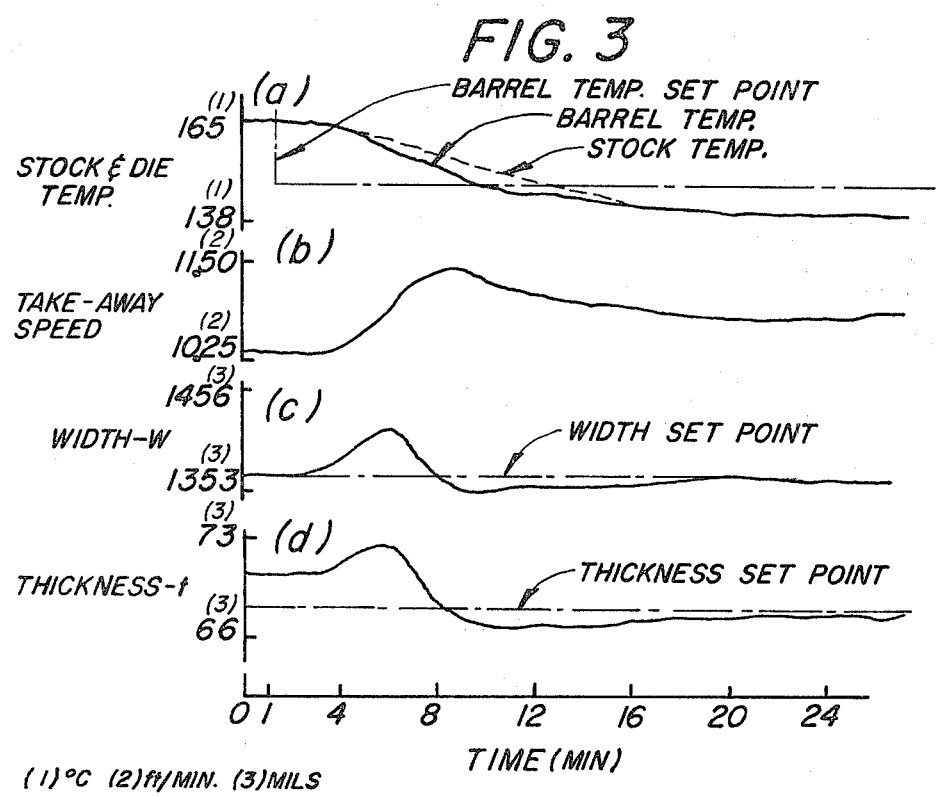
FIG. 3 is a series of graphs showing significant variables during the extrusion process used to produce the extrudate of FIG. 2, and showing how certain of these variables are changed to produce the desired conditions.

An example of an extrudate in which the temperature of the stock in the extruder is controlled in order to control shape deviations is depicted in FIG. 2, which shows the cross section of a simple extrudate having a thickness t and a width w. The process of producing the extrudate of FIG. 2 is depicted in FIG. 3. FIG. 3a shows the barrel temperature "set point" and the resulting temperature of the stock in the extruder barrel and the temperature of the die; FIG. 3b shows the speed of the take-away device 20; FIG. 3c shows the width w of the extrudate; and FIG. 3d shows the thickness t of the extrudate. In this example, the die temperature set point was adjusted so that the difference between the stock temperature and the die temperature was as close to zero as possible. Initially, the extrudate thickness (FIG. 3d) was above the specified or desired level, or "set point" level, while the extrudate width (FIG. 3c) was at the "set point" level. To decrease the thickness of the extrudate, the barrel and die temperature set points (FIG. 3a) were lowered about 22° C. at about 1 minute into the run. This reduction in the temperature set points caused a temporary increase in the output rate of the extruder, which was compensated for by increasing the take-away speed (FIG. 3b). The stock temperature (FIG. 3a) continued to decrease in response to the lowered set points. The temperature of the die decreased along with the stock temperature. At about 9 minutes into the run, both the width dimension (FIG. 3c) and the thickness dimension (FIG. 3d) were below the set points, so the take-away speed (FIG. 3b) was decreased to increase the size of the extrudate. Ultimately, the decrease in stock temperature (FIG. 3a), along with an overall increase in the take-away speed (FIG. 3b) brought about the desired decrease in extrudate thickness (FIG. 3d) without a change in width (FIG. 3c).

FIG. 3 shows that deviations between the thickness and the width can be corrected by manipulating the temperature of the stock in the extruder. If the temperature variation produces an overall size deviation, i.e., a deviation in which the thickness and the width both deviate from the set point by about the same percentage, the speed of the take-away device can be adjusted to bring the thickness and the width back to set point levels.

The manipulation of the stock temperature changes the swell properties of the extrudate material after it has been extruded through the die 16. Thermoplastic materials and rubbers swell after flowing through a restriction. Swell generally increases with increasing flow rate and decreasing material temperature. However, for some materials such as the specific polyvinyl chloride composition used in this example, the swell decreases with decreasing stock temperature over the temperature range of interest. Thus the swell of the extrudate can be controlled by manipulating stock temperature. The example in FIG. 3 shows a certain extrudate material, specifically plasticized polyvinyl chloride. By decreasing the stock temperature the extrudate swell decreases, so that the thickness of the extrudate is decreased in relationship to its width.

For other materials, the temperature dependence of swell may be estimated from laboratory rheometer measurements or from variation of actual extrusion line stock temperature and the measurement of corresponding profile shape change. After determining the temperature dependence of swell, the extrudate shape can be controlled at a fixed output rate by manipulating the stock temperature.

Using the apparatus of FIG. 1, the two sensors 22 and 23 can be positioned to measure the thickness and width (or linear weight) of a simply shaped extrudate and to feed these measurements to the control unit 25. Based upon a previously determined temperature dependence of the swell for the particular material involved, the temperature of the stock in the extruder 10 can be changed from the control unit 25 to bring the width and thickness of the extrudate 18 into a predetermined relationship. Thereafter, the continuous measurements achieved by the sensors 22 and 23 can be used to maintain the dimensions in the proper relationship, despite changes in machine operation or material properties.

Figure 4:
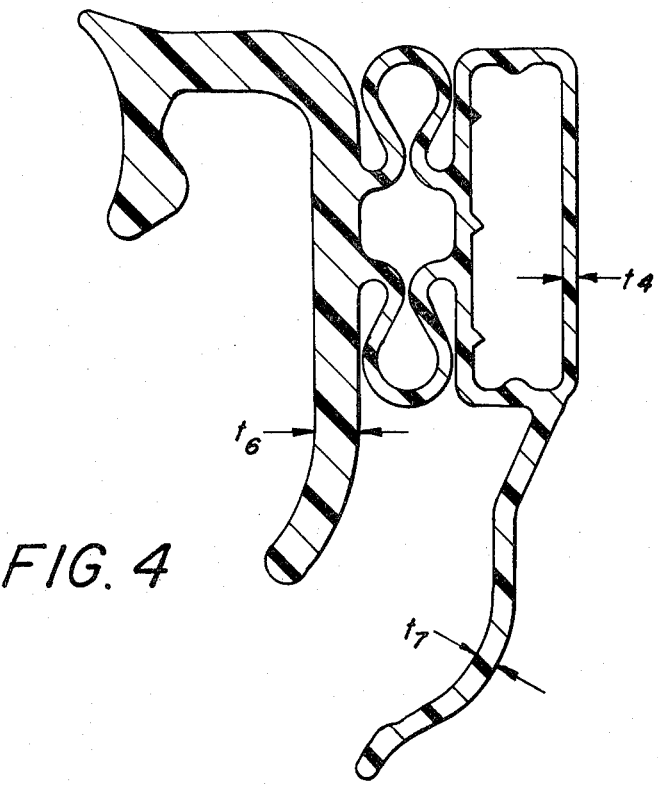
FIG. 4 is a cross-sectional view of another extrudate shape showing the dimensions which are measured and controlled.

The example of FIG. 3 is suitable for relatively simple shapes in which only the thickness and the width deviate from each other. In more complicated shapes, deviations may occur between different thicknesses, and these deviations cannot be corrected by simple manipulation of the stock temperature. An example of a more complicated extrudate cross section is shown in FIG. 4. The cross-sectional shape shown in FIG. 4 is used in a refrigerator door gasket.

In the extrudate shown in FIG. 4, one important dimension is the thickness $t_4$. The chamber adjacent to the thickness $t_4$ is designed to hold magnetic material, which secures the refrigerator door to the body of the refrigerator. If the thickness $t_4$ is too large, the magnetic material will not engage the metal of the door and the door will not be held firmly closed. If the thickness $t_4$ is too small, the door will be held too firmly and cannot be easily opened. It would not be convenient to measure the dimension $t_4$ on the extrusion line because it would be difficult to insert a sensor into the closed chamber adjacent to this dimension. However, it has been found that the dimension $t_7$ correlates with the dimension $t_4$. The thickness $t_7$ can be easily measured during the extrusion line operation. The remaining large thicknesses or the linear weight of the extrudate can be controlled by controlling the thickness $t_6$.

With the extrudate shape shown in FIG. 4, it is not possible simply to control the stock temperature because this would have the effect of increasing or decreasing all of the thicknesses. While the thickness $t_7$ would be increased or decreased using this procedure, the thickness $t_6$ would similarly be increased or decreased. For such a complicated profile, it is necessary to control one thickness relative to another thickness within the profile.

In accordance with this invention, these variations can be controlled by varying the temperature of the die 16 with respect to the temperature of the stock in the extruder 10. An increase in the die temperature relative to the stock temperature increases the smaller thicknesses, such as $t_7$, with respect to the larger thicknesses, such as $t_6$.

Figure 5:
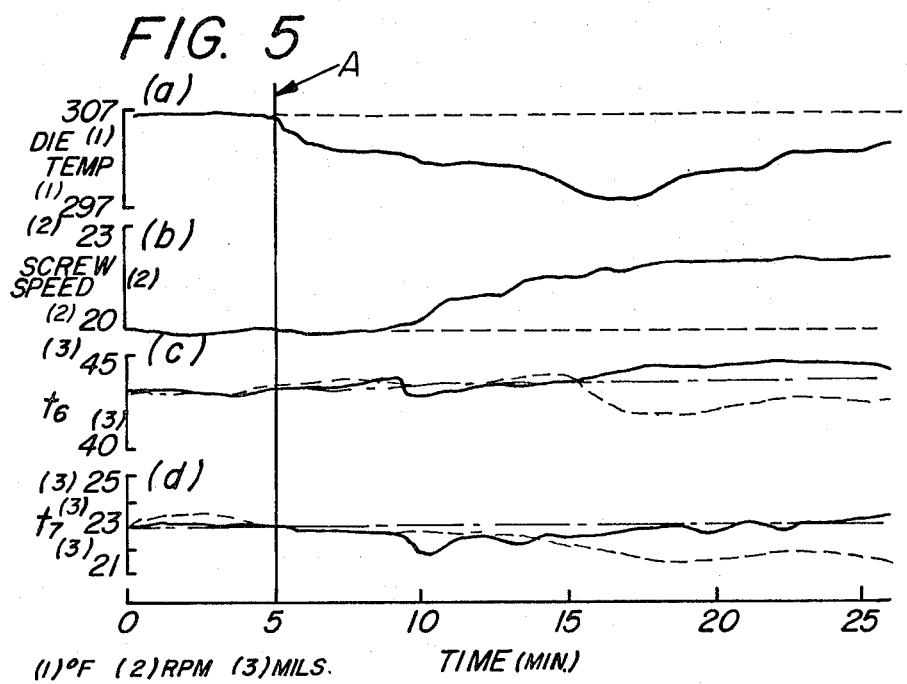
FIG. 5 is a series of graphs similar to FIG. 3, showing variables during the extrusion process used to produce the extrudate of FIG. 4.

An example of a process in which the thicknesses are controlled in this manner is shown in FIG. 5. FIG. 5a shows the temperature of the die 16, FIG. 5b shows the speed of the extruder screw 12, FIG. 5c shows the thickness $t_6$ as measured by the measuring apparatus 21, and FIG. 5d shows the measured thickness $t_7$. In FIG. 5, the broken lines represent an extrusion run in which the die temperature and the screw speed were constant, while the solid lines represent a similar run in which the die temperature and the screw speed were adjusted in order to control the thicknesses $t_6$ and $t_7$. At point A in both runs, the quality of the stock was changed in order to simulate actual run conditions in which stock conditions change. For this example, the stock was changed from virgin material to regrind material. Without controls (broken lines in FIG. 5), the thickness $t_7$ (FIG. 5d) began to drop below the set point level. Subsequently, the thickness $t_6$ (FIG. 5c) also began to drop below the set point level, but by a lesser amount. The result was both deviations in overall size and deviations in the shape of the extrudate in which the thickness $t_6$ decreased much less than the thickness $t_7$ on a percentage basis. Another run was then performed in which the smaller thickness $t_7$ was controlled by varying the screw speed, and the larger thickness $t_6$ was controlled indirectly by varying the die temperature. Other modes of control are possible. With controls (solid lines in FIG. 5), the die temperature (FIG. 5a) was decreased to increase the larger thickness $t_6$. When the thickness $t_7$ had decreased significantly below the set point level, the screw speed (FIG. 5b) was increased several times to bring the thickness $t_7$ up to the set point level. After 16 minutes, the thickness $t_6$ had increased to above its set point level, so the die temperature was increased in order to bring the thickness $t_6$ down to the set point level.

As can be seen by comparing the solid and broken lines in FIG. 5, the effect of controls was to bring both thicknesses $t_6$ and $t_7$ closer to their set point levels, whereas these thicknesses vary greatly from the set point without controls.

In FIG. 5a, the difference between the die temperature and the stock temperature is represented by the die temperature alone because the stock temperature remained relatively constant during the run so that the changes in all thickness dimensions caused by changes in swell were negligible. It is possible to control the thicknesses by manipulating the die temperature without changing the stock temperature significantly. It has been found that an increase of 20° F. in die temperature typically increases the stock temperature only about 2° F.

The increase in the die temperature relative to the stock temperature has the effect of increasing the flow rate of the stock material through thin die openings relative to the flow rate through thick die openings. This result can be explained by the fact that the die temperature has a relatively greater influence on stock temperatures and velocity profiles in thin areas in which a larger portion of the extrudate stock passes relatively close to the die surface. In thicker areas, a larger portion of the stock is relatively further away from the die surface and is less influenced by the die temperature.

While the relative speeds along the extrusion line were controlled in the example of FIG. 5 by manipulating the speed of the extruder screw 12, it is, of course, also possible to control the relative speed by manipulating the speed of the take-away device 20. For hot-feed extruders, in which screw speed control is not effective, the size of the extrudate may be controlled by varying the feed rate to the extruder. The feed rate may be varied by adjusting the width, thickness, or speed of the feed strip supplied to the extruder from the feed mill. Both the screw speed in cold-feed extruders and the feed rate for hot-feed extruders determine the output rate of the extruder, and the invention contemplates varying the extruder output rate relative to the take-away device in order to control size deviations.

It is contemplated that the control unit 25 may be a suitable microcomputer or microprocessor which would receive the measurements from the apparatus 21 and use these to adjust the temperature of the stock in the extruder 10, the temperature of the die 16, the speed of the screw 12, the feed rate, and/or the speed of the take-away device 20. In this manner, the extrusion process can be fully automated and variations in size and shape will be automatically adjusted by the control unit 25 with minimal supervision by the operator.

Other modifications and variations in the specific method herein shown and described will be apparent to those skilled in the art, all within the intended scope and spirit of the invention. While the invention has been shown and described with respect to specific embodiments thereof, these are intended for the purposes of illustration rather than limitation. Accordingly, the patent is not to be limited in scope and effect to the specific embodiments herein shown and described nor in any other way that is inconsistent with the extent to which progress in the art has been advanced by the invention.

We claim:

1. A method of producing an extrudate from stock in an extrusion line having an extruder with an extrusion die comprising the steps of:
    extruding the stock through the die at intitial relative speeds and at initial temperature conditions to produce an extrudate having an initial size and initial shape dimensions,
    measuring size and shape dimensions of the extrudate,
    varying the temperature conditions to adjust the initial shape and to maintain the shape at predetermined dimensions and
    varying the relative speeds along the extrusion line to adjust the initial size and maintain the size at predetermined dimensions.

2. A method of producing an extrudate as defined in claim 1, wherein the shape is adjusted by varying the temperature of the stock while maintaining the temperature of the die in a generally fixed relationship with respect to the temperature of the stock.

3. A method of producing an extrudate as defined in claim 1, wherein the shape is adjusted by varying the temperature of the die relative to the temperature of the stock.

4. A method of producing an extrudate as defined in claim 3, wherein the temperature of the stock is maintained generally constant.

5. A method of producing an extrudate as defined in claim 1, wherein the relative speeds are varied by varying the output rate of the extruder.

6. A method of producing an extrudate as defined in claim 5, wherein the extruder has a rotating screw, and the output rate of the extruder is varied by varying the rotational speed of the screw.

7. A method of producing an extrudate as defined in claim 1, wherein the relative speed is varied by varying the speed at which the extrudate is taken away from the extruder.

8. A method of producing an extrudate as defined in claim 1, wherein the size dimensions of the extrudate is measured by measuring the linear weight of the extrudate.

9. A method of producing an extrudate from stock in an extruder having an extrusion die comprising the steps of:
    extruding the stock through the die at an initial extruder output rate and at initial temperature conditions to produce an extrudate having an initial cross-sectional area dimension and initial thickness dimensions,
    taking away the extrudate from the extruder at an initial take-away speed,
    measuring dimensions of the extrudate,
    varying the temperature conditions to adjust the initial thickness and to maintain it at a predetermined thickness dimension and
    varying the extruder output rate relative to the take-away speed to adjust the initial cross-sectional area dimension and to maintain said area dimension at a predetermined cross-sectional area dimension.

10. A method of producing an extrudate as defined in claim 9, wherein all thickness dimensions are adjusted together by varying the temperature of the stock while maintaining the temperature of the die in a generally fixed relationship with respect to the temperature of the stock.

11. A method of producing an extrudate as defined in claim 9, wherein different thickness dimensions are adjusted with respect to each other by varying the temperature of the die with respect to the temperature of the stock.

12. A method of producing an extrudate as defined in claim 11, wherein the temperature of the stock is maintained generally constant.

13. A method of producing an extrudate as defined in claim 9, wherein the cross-sectional area dimension is adjusted and maintained by varying the extruder output rate while maintaining the take-away speed generally constant.

14. A method of producing an extrudate as defined in claim 13, wherein the extruder has a rotating screw and the extruder output rate is varied by varying the speed of rotation of the screw.

15. A method of producing an extrudate as defined in claim 9, wherein the cross-sectional area dimension is adjusted and maintained by varying the speed by which the extrudate is taken away from the extruder while maintaining the extruder output rate generally constant.

16. A method of producing an extrudate as defined in claim 9, wherein the cross-sectional area dimension of the extrudate is measured by measuring the linear weight of the extrudate.

17. A method of producing an extrudate from stock in an extruder having an extrusion die comprising the steps of:
   extruding the stock through the die at an initial extruder output rate and at an initial stock temperature to produce an extrudate having an initial width and an initial thickness,
   taking away the extrudate from the extruder at an initial take-away speed,
   measuring the width and thickness of the extrudate,
   varying the temperature of the stock in the extruder while maintaining the temperature of the die in a generally fixed relationship with respect to the temperature of the stock to adjust the initial thickness and to maintain said thickness at a predetermined thickness dimension and
   varying the extruder output rate relative to the take-away speed to adjust the initial width of the extrudate and to maintain said width at a predetermined width dimension.

18. A method of producing an extrudate from stock in an extruder having an extrusion die comprising the steps of:
   extruding the stock through the die at an initial extruder output rate and at initial temperature conditions of the stock and the die to produce an extrudate having an initial size and initial thickness dimensions,
   taking away the extrudate from the extruder at an initial take-away speed,
   measuring the thickness dimensions of the extrudate,
   varying the temperature of the die with respect to the temperature of the stock to adjust the thickness dimensions and to maintain said thickness dimensions in a predetermined relationship and
   varying the extruder output rate relative to the take-away speed to adjust the size of the extrudate while maintaining the size in said predetermined relationship.

19. A method of producing an extrudate as defined in claim 5, wherein the output rate of the extruder is varied by varying the feed rate.

* * * * *